(12) United States Patent
Tokumitsu

(10) Patent No.: US 7,648,689 B2
(45) Date of Patent: Jan. 19, 2010

(54) PROCESS FOR THE PRODUCTION OF INP FINE PARTICLES AND INP FINE PARTICLE DISPERSION OBTAINED BY THE PROCESS

(75) Inventor: Shuzo Tokumitsu, Tokyo (JP)

(73) Assignee: Hoya Corporation, Tokyo (JP)

( * ) Notice: Subject to any disclaimer, the term of this patent is extended or adjusted under 35 U.S.C. 154(b) by 456 days.

(21) Appl. No.: 11/666,227

(22) PCT Filed: Mar. 10, 2006

(86) PCT No.: PCT/JP2006/305312

§ 371 (c)(1),
(2), (4) Date: May 15, 2007

(87) PCT Pub. No.: WO2006/101015

PCT Pub. Date: Sep. 28, 2006

(65) Prior Publication Data

US 2008/0199381 A1   Aug. 21, 2008

(30) Foreign Application Priority Data

Mar. 23, 2005 (JP) .............................. 2005-083707

(51) Int. Cl.
| | |
|---|---|
| B22F 1/00 | (2006.01) |
| B22F 9/00 | (2006.01) |
| C21B 15/04 | (2006.01) |
| C22B 3/00 | (2006.01) |
| H01L 21/00 | (2006.01) |
| H01L 21/28 | (2006.01) |
| C09K 3/00 | (2006.01) |
| C01B 25/00 | (2006.01) |
| C01B 33/26 | (2006.01) |
| C01G 31/00 | (2006.01) |
| C01G 28/00 | (2006.01) |
| C30B 23/00 | (2006.01) |

(52) U.S. Cl. .............................. 423/299; 423/1; 423/62; 423/87; 423/328.2; 423/111; 423/115; 75/362; 75/365; 75/371; 977/896; 977/815; 977/818; 977/813; 977/816; 977/819; 977/820; 977/823; 977/824; 438/151; 438/604; 516/78; 117/84

(58) Field of Classification Search .................. None
See application file for complete search history.

(56) References Cited

U.S. PATENT DOCUMENTS 7,557,028 B1 * 7/2009 Scher et al. .................. 438/604

(Continued)

FOREIGN PATENT DOCUMENTS

JP       2003-286292        10/2003

(Continued)

OTHER PUBLICATIONS

Khanna et al.; A Novel Synthesis of Indium Phosphide NanoParticles; Materials Letters; 57, pp. 4617-4621; 2003.*

(Continued)

*Primary Examiner*—Melvin C Mayes
*Assistant Examiner*—Guinever S Gregorio
(74) *Attorney, Agent, or Firm*—Nixon & Vanderhye, P.C.

(57) ABSTRACT

The invention is to provide a process for industrially advantageously producing InP fine particles having a nano-meter size efficiently in a short period of time and an InP fine particle dispersion, and there are provided a process for the production of InP fine particles by reacting an In raw material containing two or more In compounds with a P raw material containing at least one P compound in a solvent wherein the process uses, as said two or more In compounds, at least one first In compound having a group that reacts with a functional group of P compound having a P atom adjacent to an In atom to be eliminated with the functional group in the formation of an In-P bond and at least one second In compound having a lower electron density of In atom in the compound than said first In compound and Lewis base solvent as said solvent, and InP fine particles obtained by the process.

10 Claims, 9 Drawing Sheets

U.S. PATENT DOCUMENTS

2004/0007169 A1     1/2004    Ohtsu et al.
2008/0245186 A1* 10/2008   Yang et al. .................... 75/362

FOREIGN PATENT DOCUMENTS

| | | |
|---|---|---|
| JP | 2004-510678 | 4/2004 |
| JP | 2004-165514 | 6/2004 |
| WO | WO 02/29140 A1 | 4/2002 |
| WO | WO 0229140 A1 * | 4/2002 |

OTHER PUBLICATIONS

Battaglia et al.; Formation of High Quality InP and InAs Nanocrystals in a Noncoordinating Solvent; Nano Letters; vol. 2, No. 9 pp. 1027-1030; 2002.*
International Search Report of PCT/JP2006/305312, mailed Jun. 20, 2006.
J. Phys. Chem. 1994, 98, 4966-4969.
Polyhedron vol. 13, No. 8, p. 1131-1148, 1994.
Nano Letters 2002, vol. 2, No. 9, 1027-1030.

* cited by examiner

US 7,648,689 B2

PROCESS FOR THE PRODUCTION OF INP FINE PARTICLES AND INP FINE PARTICLE DISPERSION OBTAINED BY THE PROCESS

TECHNICAL FIELD

The present invention relates to a process for the production of InP fine particles and an InP fine particle dispersion obtained by the process. More specifically, the present invention relates to a process for the production of InP fine particles, which are expected to be a luminescence center (radioactive recombination center) material, as ones having a nano-meter size efficiently in a short period of time by a wet method, and a dispersion of the InP fine particles that are obtained by the above process and are excellent in dispersibility and stability with the passage of time.

TECHNICAL BACKGROUND

In recent years, semiconductor crystallites (fine particles) are drawing attention and are being actively studied. Semiconductor crystallites have a characteristic feature that the emission wavelength of one material can be controlled by controlling the particle size of the material on the basis of quantum confinement effects, and they are expected to be luminescence center materials.

Of these, CdSe crystallite is easily produced and the particle size of CdSe is also relatively easily controllable, so that it has high utility and studies thereof have been advanced. However, the defect thereof is that it has toxicity derived from Cd.

On the other hand, InP crystallite is free of the toxicity problem that Cd has, so that it draws attention for a new luminescence center.

As a method for synthesizing InP, various methods have been known. For example, there are reports of (1) a method in which a mixture of $P((CH_2)_7CH_3)_3$ with $OP((CH_2)_7CH_3)_3$ is used as a solvent, $InCl(COO)_2$ is used as an In material, $P(Si(CH_3)_3)_3$ (to be sometimes referred to as "P(TMS) 3" hereinafter) is used as a P material and these materials are reacted at 260 to 300° C. for 3 to 6 days to synthesize InP (for example, see "J. Phys. Chem.", Vol. 98, page 4966 (1994)) and (2) a method in which $In(OR)_3$ is used as an In material, excess $P(TMS)_3$ is used as a P material and these materials are reacted in a boiling pyridine solution to directly synthesize amorphous InP (specifically, $InP[P(TMS)_3]_x$) soluble in toluene (for example, see "Polyhedron" Vol. 13, page 1131 (1994)).

However, the above method (1) takes a long time for the synthesis and is poor in productivity, so that it cannot be said that the method (1) is satisfactory in industrial practice. In the method (2), further, generated InP is amorphous and cannot be used as a light-emitting material for the luminescence center.

InP particles obtained according to any conventional method have defects that they are poor in dispersibility in a solution and are liable to precipitate during a reaction.

On the other hand, as a dry process, there is known a method in which InP is formed by a physical vapor deposition method (PVD method) or a chemical vapor deposition method (CVD method). In these methods, however, not only an expensive apparatus is required but also it is difficult to accurately control the atomic ratio of In and P, so that there is a defect that it is difficult to obtain InP having predetermined performances.

DISCLOSURE OF THE INVENTION

Under the circumstances, it is an object of the present invention to provide a process for producing InP fine particles, which are expected to be a new luminescence center material, as ones having a nano-meter size industrially advantageously and efficiently in a short period of time by a wet method, and an InP fine particle dispersion that is obtained by the above process and is excellent in dispersibility and stability against the passage of time.

The present inventor has made diligent studies and as a result it has been found that the above object can be achieved by employing two or more In compounds having specific properties respectively as In materials and reacting them with a P compound in a Lewis base solvent. The present invention has been completed on the basis of this finding.

That is, the present invention provides (1) a process for the production of InP fine particles, which comprises reacting an In raw material consisting of two or more In compounds with a P raw material consisting of at least one P compound in a solvent, the process using, as said two or more In compounds, at least one first In compound having a group that reacts with a functional group of P compound having a P atom adjacent to an In atom to be eliminated with the functional group in the formation of an In—P bond and at least one second In compound having a lower electron density of In atom in the compound than said first In compound, and the process using a Lewis base solvent as said solvent, (2) a process as recited in the above (1), wherein the first In compound is an In compound selected from indium hydroxide, indium alkoxide, indium sulfide, indiumamide, indium organic acid salt or indium inorganic acid salt, (3) a process as recited in the above (1) or (2), wherein the second In compound is $InR_n$ in which R is a hydrogen atom, a halogen atom or a hydrocarbon group and n is a number that satisfies the relationship of $1 \leq n \leq 3$, provided that when a plurality of Rs are present, any one of the plurality of RS may be the same as, or different from, the other or every other one, (4) a process as recited in any one of the above (1) to (3), wherein the In compounds and the P compound(s) are used in such a manner that the In atoms are in a stoichiometrically excess amount over the P atoms, (5) a process as recited in the above (4), wherein the molar ratio of the In atoms and the P atoms is 1:0.1 to 1:0.9, (6) a process as recited in any one of the above (1) to (5), wherein the first In compound and the second In compound are used in an In atom molar ratio of 0.2:1 to 8:1, (7) a process as recited in the above (6), wherein the ratio of the first In compound and the second In compound used is adjusted to control the particle size of the InP fine particles to be generated.

(8) a process as recited in any one of the above (1) to (7), wherein the Lewis base solvent is at least one solvent selected from solvents that do not react with the In material and the P material and dissolves the In material and the P material, (9) a process as recited in any one of the above (1) to (8), wherein the In fine particles generated have the solvent coordinated around them,

(10) a process as recited in any one of the above (1) to (9), wherein the temperature of the reaction is 150 to 350° C.,

(11) an InP fine particle dispersion obtained by the process recited in any one of the above (1) to (10), and

(12) an InP fine particle dispersion as recited in the above (11), wherein the InP fine particles have an average particle size of 1 to 100 nm.

According to the present invention, InP fine particles that are expected to be a new luminescence center material can be produced by a wet method as ones having a nano-meter size efficiently in a short period of time and industrially advantageously.

Further, according to the present invention, there can be provided an InP fine particle dispersion that is obtained by the above process and that is excellent in dispersibility and excellent in stability against the passage of time.

PREFERRED EMBODIMENTS OF THE INVENTION

Figure 1:
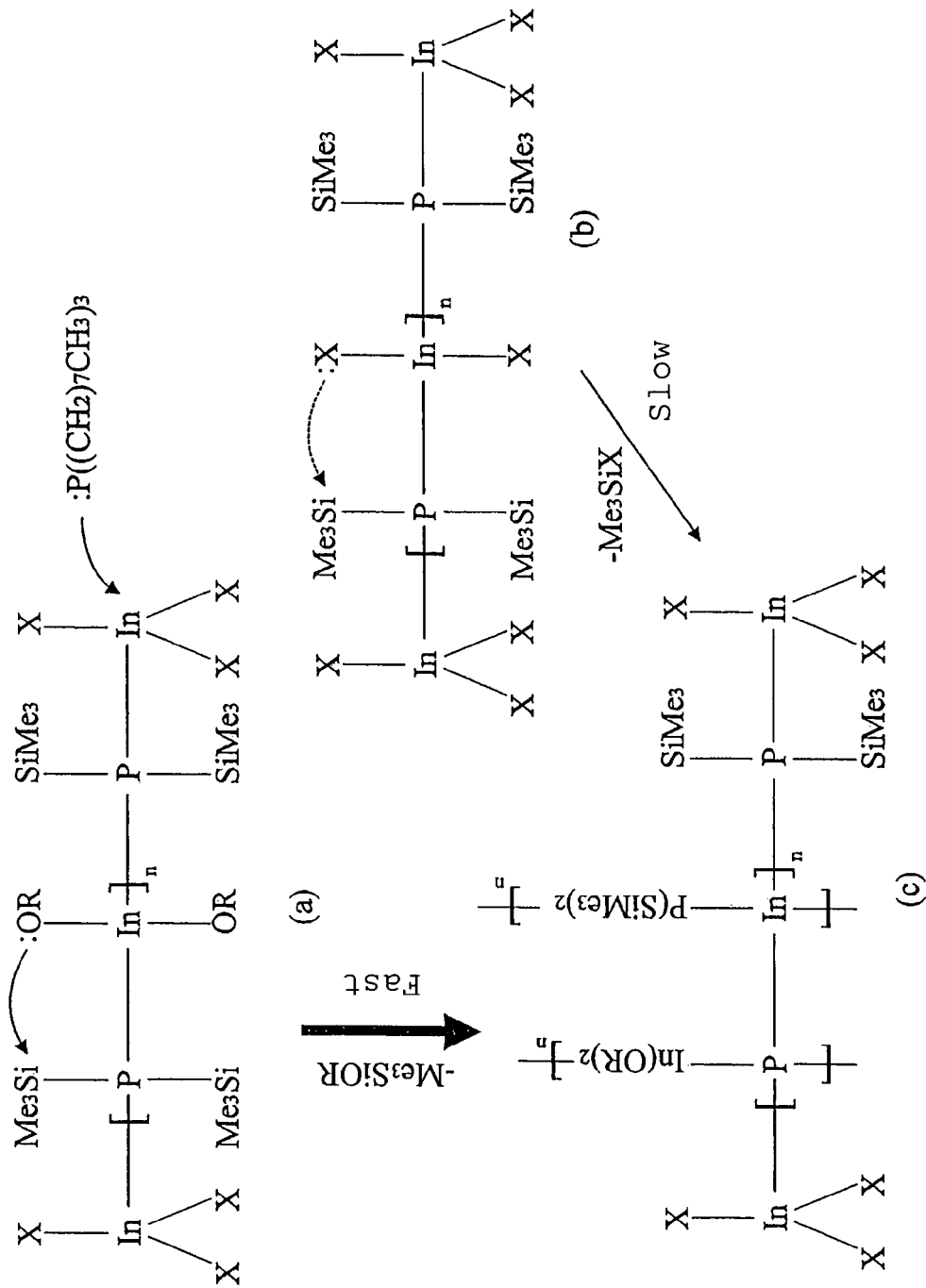
FIG. 1 is a hypothetical drawing that shows the mechanism of generation of InP fine particles according to the process of the present invention.

In the process for the production of InP fine particles, provided by the present invention, an In raw material consisting of two or more In compounds and a P raw material consisting of at least one P compound are reacted in a Lewis base solvent to produce InP fine particles.

As the above two more In compounds, there are used at least one first In compound having a group that reacts with a functional group of P compound having a P atom adjacent to an In atom to be eliminated with the functional group in the formation of an In—P bond and at least one second In compound having a lower electron density of In atom in the compound than said first In compound.

Examples of the above first In compound include indium hydroxide, indium alkoxide, indium sulfide, indium amide, indium organic acid salt or indium inorganic acid salt.

The above indium hydroxide includes indium trihydroxide. The above indium alkoxide includes indium tri-lower-alkoxides such as indium trimethoxide, indium triethoxide, indium tri-n-propoxide, indium triisopropoxide, indium tri-n-butoxide, indium triisobutoxide, indium tri-sec-butoxide and indium tri-tert-butoxide. In the alkoxyl group each of these indium tri-lower-alkoxide, hydrogen atom(s) thereof may be replaced with a proper substituent such as a halogen atom, an alkoxyl group, an amino group, or the like.

The indium sulfide includes indium tri-lower-alkyl sulfides such as indium trimethyl sulfide, indium triethyl sulfide, indium tri-n-propyl sulfide, indium triisopropyl sulfide, indium tri-n-butyl sulfide, indium triisobutyl sulfide, indium tri-sec-butyl sulfide and indium tri-tert-butyl sulfide. In the alkyl sulfide group each of these indium tri-lower-alkyl sulfides, hydrogen atom(s) thereof may be replaced with a proper substituent such as a halogen atom, an alkoxyl group, an amino group, or the like.

The indium amide includes indium triamide and indium tris(mono- or di-lower alkyl amides) such as indium tris(monomethylamide), indium tris(dimethylamide), indium tris(monoethylamide), indium tris(diethylamide), indium tris(mono-n-propylamide), indium tris(di-n-propylamide), indium tris(monoisopropylamide) and indium tris(diisopropylamide). In the alkyl group each of these indium tris(mono- or di-lower alkyl amides), hydrogen atom(s) thereof may be replaced with a proper substituent such as a halogen atom, an alkoxyl group, an amino group, or the like.

The indium organic acid salt includes, for example, indium carboxylates such as $(R^1COO—)_3In$, indium organic phosphates such as $(R^1PO_3—)_3In$ and $(R^1{}_2PO_2—)_3In$ and indium sulfonates such as $(R^1SO_3—)_3In$. The above $R^1$ is a hydrocarbon group that may have a proper substituent such as a halogen atom, an alkoxyl group, an amino group or the like. Further, the indium inorganic acid salt includes, for example, carbonate, sulfate and phosphate.

Of these first In compounds, indium trialkoxides are preferred, and indium triisopropoxide is particularly preferred. In the present invention, these first In compounds may be used singly or in combination of two or more compounds of these.

The second In compound is an In compound having a lower electron density of In atom in the compound than the first In compound. As the second In compound, there can be used a compound having the formula of $InR_n$, in which R is a hydrogen atom, a halogen atom or a hydrocarbon group and n is a number that satisfies the relationship of $1 \leq n \leq 3$, provided that when a plurality of Rs are present, any one of the plurality of Rs may be the same as, or different from, the other or every other one.

Examples of the above second In compound includes monohalogenoindium dihydride, dihalogenoindium monohydride, trihalogenoindium, trimethyl indium, triethyl indium, tri-n-propylindium, triisopropyl indium, tri-n-butyl indium, triisobutyl indium, tri-sec-butyl indium, tri-tert-butyl indium, monohalogenodimethyl indium, dihalogenomonomethyl indium, monohalogenodiethyl indium, dihalogenomonoethyl indium, dihalogenomono-n-propyl indium, monohalogeno-di-n-propyl indium, dihalogenomonoisopropyl indium, monohalogenodiisopropyl indium, monomethyl indium dihydride, dimethyl indium monohydride, monoethyl indium dihydride, diethyl indium monohydride, mono-n-propyl indium dihydride, di-n-propyl indium monohydride, monoisopropyl indium dihydride and diisopropyl indium monohydride. In these In compounds, the halogen atom of the halogenoindium includes a fluorine atom, a chlorine atom, a bromine atom and an iodine atom.

Of these second In compounds, triahlogenoindium is preferred and trichloroindium is particularly preferred. In the present invention, these second In compounds may be used singly or in combination of two or more compounds of these.

The P compound as a P raw material is not specially limited so long as it has a functional group that reacts with a functional group of the above In compound to be easily eliminated. For example, a tris(trialkylsilyl)-phosphine represented by $(R^2{}_3Si)_3P$ (in which $R^2$ is an alkyl group having 1 to 4 carbon atoms and any one of the three $R^2$s may be the same as, or different from, every other one) is preferred.

Specific examples of the above tris(trialkylsilyl)-phosphine include tris(trimethylsilyl)phosphine, tris(triethylsilyl) phosphine, tris(tri-n-propylsilyl)-phosphine and tris(triisopropylsilyl)phosphine. Of these, tris(trimethylsilyl)phosphine is particularly preferred.

In the present invention, the above P compounds may be used singly or in combination of two or more compounds of these.

Further, the Lewis base solvent is preferably a solvent that does not react with the In raw material and the P raw material under reaction conditions and that dissolves the In raw material and the P raw material. Examples of the above Lewis base solvent include amine, phosphine, sulfide, pyridine, furan, thiophene, phosphine oxide and nitrile solvents. Of these, phosphine, phosphine oxide and pyridine solvents are preferred, and specific examples thereof preferably include trioctylphosphine, trioctylphosphine oxide and 4-phenylpropylpyridine.

In the present invention, the above Lewis base solvent may be used singly or in combination of two or more solvents of these. In this case, it is required to select solvents that are fully miscible.

In the process of the present invention, the In raw material consisting of at least one of the above first In compounds and at least one of the above second In compounds and the P raw material consisting of at least one of the above P compounds are reacted in the above Lewis base solvent to produce InP fine particles.

In the above reaction, the ratio of the first In compound and the second In compound for use as the In raw material, by an In atom molar ratio, is preferably 0.2:1 to 8:1, more preferably 0.5:1 to 3:1 from the viewpoint of controlling of the particle size and particle size distribution of InP fine particles to be obtained. By adjusting the above amount ratio, the particle size and particle size distribution of InP fine particles to be generated can be controlled. When the amount of the first In compound is larger than the amount of the second In compound on the basis of In atom molar amount, the particle size and particle size distribution of InP fine particles are smaller, the emission spectrum is broadened and the emission wavelength tends to shift toward the shorter wavelength side.

For example, when it is intended to obtain InP fine particles having a specific particle size by one reaction, the reaction can be carried out in a manner in which the amount of the first In compound is larger than that of the second In compound.

On the other hand, when it is intended to obtain InP fine particles having various particle sizes by one reaction, the reaction can be carried out in a manner in which the amount of the first In compound is smaller than that of the second In compound. In this case, InP fine particles obtained are classified, whereby various groups of InP fine particles having a classified particle size each can be obtained by one reaction.

Further, concerning the ratio of the amount of the In compounds (total amount of the first and second In compounds) and the amount of the P compound, preferably, the in compounds are used in a stoichiometrically excess amount over the P compound in view of the dispersibility of InP fine particles to be obtained, in the solvent. More preferably, the In compounds and the P compound are used such that the In atoms and the P atoms have an In atom:P atom molar ratio of 1:0.1 to 1:0.9, and particularly preferably, the In compounds and the P compound are used such that In atoms and the P atoms have an In atom:P atom molar ratio of 1:0.5 to 1:0.8.

Further, the concentration of the In compounds and P compound in the Lewis base solvent, by an In concentration, is generally approximately 0.005:0.1 mol/L, preferably 0.01:0.75 mol/L, in view of reactivity and the reactivity and dispersibility of InP fine particles to be generated.

From the viewpoint of a reaction rate, the particle size and dispersibility of InP fine particles to be generated and the boiling point and thermal stability of the Lewis base solvent used, the reaction temperature is generally approximately 150 to 350° C., preferably 200 to 350° C., more preferably 250 to 330° C.

The reaction pressure is not specially limited, and the reaction can be carried out under atmospheric pressure or under elevated pressure. Generally, when the boiling temperature of the Lewis base solvent is equivalent to, or higher than, the reaction temperature, the reaction is carried out under atmospheric pressure, and when the above boiling point is lower than the reaction temperature, the reaction is carried out under a spontaneous pressure.

Differing depending upon the reaction temperature, the kinds of the In raw material and the P raw material, the kind of the solvent and the controlling of the particle size and particle size distribution of InP fine particles, the reaction time period cannot be uniformly determined. However, it is generally 1 to 600 minutes, preferably 5 to 300 minutes, more preferably 5 to 200 minutes.

In the above manner, there are obtained InP fine particles having an average particle size of approximately 1 to 100 nm, preferably 2 to 10 nm. The standard dispersion value of particle size of the above InP fine particles is generally approximately 2 to 30%. Further, the above InP fine particles have remarkably excellent dispersibility, and no precipitation is recognized during the reaction and in the reaction solution obtained by the reaction.

It is considered that the above InP fine particles have excellent dispersibility because solvent is coordinated around individual InP fine particles and inhibits the aggregation of the particles. It is considered that when the reaction is carried out while using the In compounds and the P compound in such a manner that the In atoms are in a stoichiometrically excess amount over the P atoms, the number of In atoms comes to be larger than the number of P atoms on the terminal (surface) of each individual InP fine particle, which results in an increase in coordination of solvent, so that the InP fine particles are more improved in dispersibility.

After the reaction, ethanol or the like is added to form a precipitate of InP fine particles, the precipitate is recovered by solid-liquid separation according to centrifugal separation or the like, a proper solvent is added thereto to prepare a dispersion, and these procedures are repeated, whereby free Lewis base solvent can be removed.

In the process of the present invention, the mechanism in which InP fine particles of a nano-meter size having excellent dispersibility (to be referred to as "InP nano-crystal particles" hereinafter) are formed is not necessarily clear, while a mechanism shown in FIG. 1 is thinkable as a hypothesis.

FIG. 1 is the drawing of a hypothesis that shows a mechanism in which InP nano-crystal particles having excellent dispersibility are generated when indium trialkoxide [In(OR)$_3$:R=hydrocarbon group] is used as a first In compound, trihalogenoindium (InX$_3$) is used as a second In compound, tris(trimethylsilyl)phosphine [P(SiMe$_3$)$_3$] is used as a P compound and trioctyl phosphine [P((CH$_2$)$_7$CH$_3$)$_3$] (to be referred to as "TOP" hereinafter) is used as a Lewis base solvent. In FIG. 1, (a)→(c) shows one example of the process of the present invention for the production of InP crystal fine particles, and (b)→(c) shows a conventional method (using one type of an In raw material).

For producing InP nano-crystal particles having high dispersibility or for preventing the formation of a precipitate during the reaction, it is desirable to use the In compounds and the P compound in such a manner that the In atoms are in a stoichiometrically excess amount over the P atoms, as mentioned above. In this case, when the In compounds and the P compound are mixed in a Lewis base solvent, it is considered that a precursor that is a chain polymer shown by (a) in FIG. 1 is first generated.

The initial process of formation of InP from the precursor (a) is considered to be as below. First, trimethylsilyl group on phosphorus and alkoxide group on indium which are adjacent to each other in the precursor (a) cause β-elimination, and then σ-bond between In—P is newly formed therein to generate a crystal nucleus (c) of InP.

In the conventional process, similarly, trimethylsilyl group on phosphorus and halogen on indium which are adjacent to each other in a precursor (b) cause β-elimination, and then σ-bond between In—P is newly formed therein to generate a crystal nucleus (c) of InP (the reaction sometimes takes several days). In these reactions, alkoxyl group has a stronger interaction with trimethylsilyl group than halogen atom, and the β-elimination proceeds remarkably faster in the precursor (a) in the process of the present invention than in the precursor (b) in the conventional process. Therefore, the precursor (a) having sites derived from alkoxides in the chain generates InP nano-crystal particles at a remarkably high velocity as compared with the precursor (b) having no such sites.

The dispersibility of the above InP nano-crystal particles in a solvent will be explained. TOP as a solvent is a Lewis base having a non-shared electron pair (lone electron pair) on a phosphorus atom of its molecule and having hydrocarbon groups (octyl groups). It is considered that the precursor (a) and the precursor (b) are easily solvated with the solvent due to affinity between the octyl group on TOP as the solvent and trimethylsilyl group on phosphorus. However, when indium trialkoxide alone was used as an In raw material, a precipitate of InP nano-crystal particles was generated during the reaction. It has been accordingly found that it is difficult to generate InP nano-crystal particles dispersed in the solvent on the basis only of the salvation between trioctyl group on TOP and trimethylsilyl group on phosphorus.

The present inventors have therefore employed the first In compound and the second In compound as an In raw material and accordingly found a process in which the reaction velocity is high and InP nano-crystal particles dispersed in a solvent are generated. That is, by using, as the second In compound, a compound having a lower electron density in the compound than the first In compound, the Lewis base solvent has been solvated with In atom of the second In compound, whereby InP nano-crystal particles dispersed in the solvent have been successfully generated. That is, in the precursor (a), TOP is in a state where it is easily coordinated around In atom derived from the trihalogenoindium, and the precursor (a) can be converted to a crystal nucleus (c) of InP while it is solvated.

In the thus-formed InP nano-crystal particles, TOP is coordinated on their surfaces, so that the aggregation of the particles is inhibited and the InP nano-crystal particles are hence remarkably improved in dispersibility.

According to the present invention, there is also provided an InP fine particle dispersion obtained by the above process of the present invention. The InP fine particles in the dispersion generally have an average particle size of 1 to 100 nm, preferably 2 to 10 nm, and they are remarkably excellent in dispersibility. The InP fine particles can be surface-modified while maintaining the particle size thereof. For example, they can be coated with other material. Further, the dispersibility thereof can be controlled by changing a solvent that is coordinated on the surface thereof.

EXAMPLES

The present invention will be explained with reference to Examples hereinafter, while the present invention shall not be limited by these Examples.

Example 1

InP was produced by the following method. Mixing and synthesis of reagents were all carried out in a nitrogen atmosphere. Further, reagents were used as they were without any treatment unless otherwise specified.

[Synthesis of InP Fine Particles]

In this Example, indium isopropoxide (In(OiPr)$_3$) and anhydrous indium chloride (InCl$_3$) (both supplied by Kojundo Chemical Laboratory Co., Ltd.) were used as In raw materials. Tris(trimethylsilyl)phosphine (P(TMS)$_3$) (supplied by Acros Organics Corporation) was used as a P raw material, and trioctyl phosphine (TOP) (supplied by Tokyo Chemical Industry Co., Ltd.) that had been distilled under reduced pressure was used as a solvent.

First, 17.6 mg (60 μmol) of In(OiPr)$_3$ and 13.3 mg (60 mol) of InCl$_3$ were mixed, and the mixture was dissolved in 2 g of TOP (that is, an In concentration of 0.05 mol/L). Then, to this solution was added 26.3 μl (90 μmol) of P(TMS)$_3$, and the mixture was heated to 300° C. In this case, there was found a change in color of the solution from yellow to dark brown. InP fine particles were synthesized by heating for 10 minutes. Thereafter, the reaction solution was allowed to naturally cool to room temperature, to give a dispersion of InP fine particles in the TOP solvent. No precipitate was observed in the obtained dispersion.

[Analysis of InP Fine Particles]

To the above-obtained dispersion was added approximately 10 ml of ethanol (supplied by Wako Pure Chemical Industries, Ltd.) to generate a precipitate of the InP fine particles. The thus-generated precipitate was recovered by centrifugal separation, and approximately 1 ml of toluene (supplied by Wako Pure Chemical Industries, Ltd.) was added thereto, to give a dispersion of the InP fine particles in toluene (no precipitate was formed). Further, the addition of ethanol—the centrifugal separation—the dispersing in toluene was repeated several times. Free TOP remaining in the dispersion can be removed by these procedures.

Figure 2:
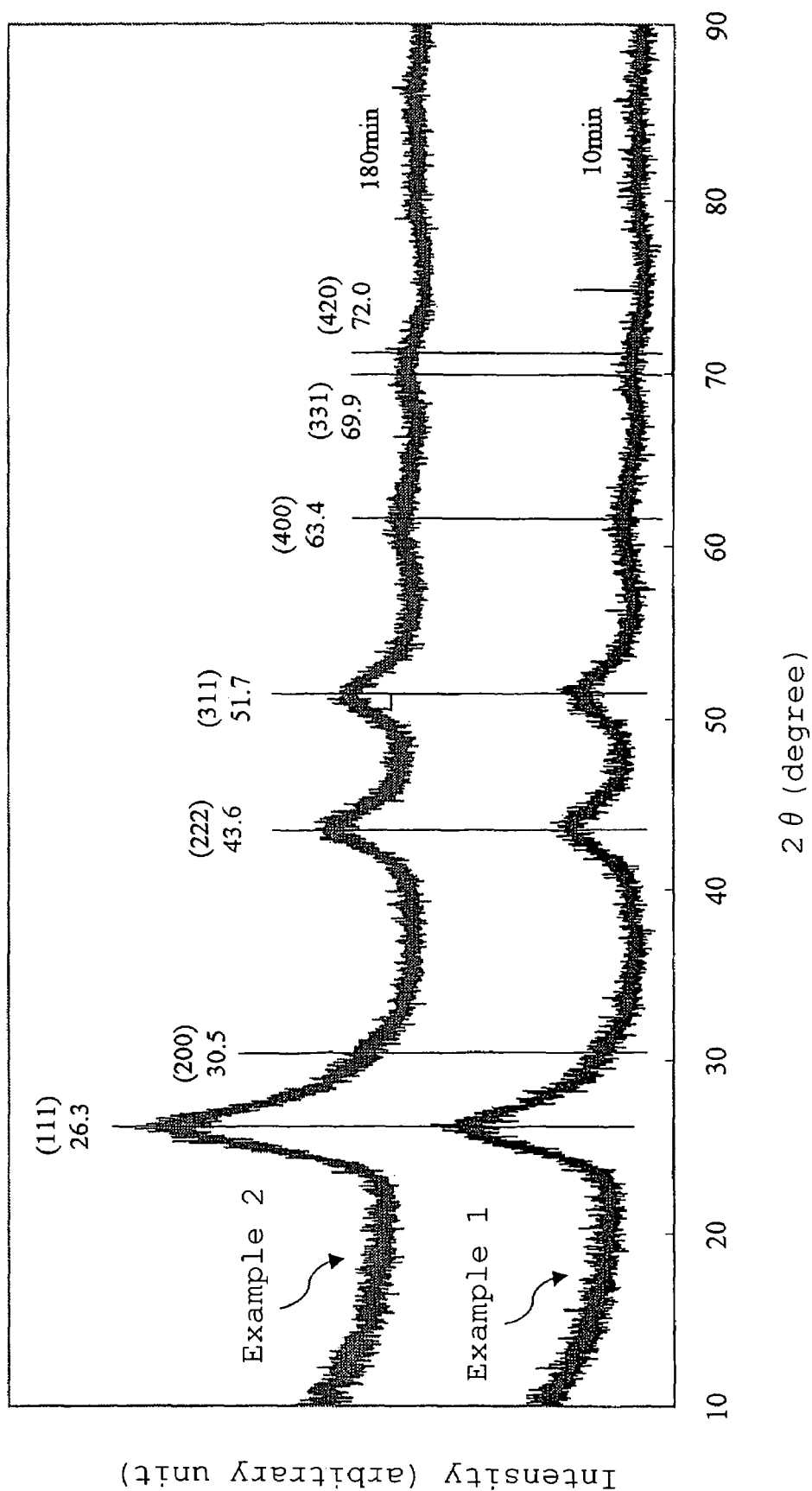
FIG. 2 shows an XRD pattern of InP fine particles obtained in Examples 1 and 2.

The thus-obtained InP fine particles were analyzed with a powder X-ray diffraction (XRD) apparatus to show a diffraction pattern of a zincblende type. FIG. 2 shows the XRD pattern. In this Figure, it was found that the positions of scattering peaks were in agreement with the peak positions of bulk InP. Further, as a result of the analysis by a small angle X-ray scattering measuring apparatus (SAXS), it was found that the obtained InP fine particles had an average particle size of 4.28 nm and a standard dispersion of 22.3%.

Further, the obtained InP fine particles were measured for absorption spectrum and emission spectrum excited at 460 nm, to show peaks caused by exciton around 645 and 660 nm, so that they were found to be working as a quantum dot. In addition, a peak was also observed around 750 nm, and it is considered that the peak is caused by trap states formed by defect states and surface states near the surface of each InP fine particle. It has been found that the relative intensity of emission derived from the above trap states is decreased by increasing the heating time period.

In this Example, InP fine particles were generated by various reaction temperatures at 250 to 320° C. to give similar results. While the reaction time period was 10 minutes long in this Example, it was found that a diffraction pattern of a zincblende type could be also obtained when the reaction time period was 2 minutes long.

Example 2

A dispersion of InP fine particles were obtained in the same manner as in Example 1 except that the heating time period was changed to 180 minutes. No precipitate was observed in the obtained dispersion.

The above dispersion of InP fine particles was treated in the same manner as in Example 1, and the InP fine particles were subjected to the XRD analysis. FIG. 2 shows an XRD pattern thereof. In this Figure, it was found that the positions of scattering peaks were in agreement with the peak positions of bulk InP. Further, as a result of the SAXS analysis, it was found that the obtained InP fine particles had an average particle size of 5.17 nm and a standard dispersion of 22.2%.

Example 3

[Surface Coating with ZnSe Shell]

By constructing a shell formed of ZnSe, ZnS or the like on the above InP fine particles each, the emission from the trap states can be removed, and the exciton confinement effect in the InP fine particles by coating the InP fine particles with a material having a broader band gap than InP can be obtained, so that the emission intensity derived from the excitons can be increased.

In this Example, first, precursor solutions of Zn and Se were respectively prepared by the following procedures. Reagents were used as they were without treating them unless otherwise specified.

110 Milligrams of zinc acetate dihydrate and 735 mg of oleic acid were added to 15 g of octadecene (these were all supplied by Wako Pure Chemical Industries, Ltd.), and the mixture was heated to 180° C. while nitrogen was blown into it, whereby water and acetic acid were removed. After heated for 1 hour, the mixture was allowed to naturally cool to room temperature to show the precipitation of zinc oleate. After the cooling, 5 g of TOP (supplied by Tokyo Chemical Industry Co., Ltd.) was added, and the mixture was shaken until the precipitated zinc oleate was fully dissolved, to give a zinc precursor solution.

A selenium precursor solution was prepared by dissolving 494 mg of particulate selenium (diameter: approximately 2 mm) (supplied by Aldrich Corporation) in 25 g of TOP (supplied by Tokyo Chemical Industry Co., Ltd.).

Then, InP fine particles were surface-coated with ZnSe by the following procedures using the above-prepared zinc precursor solution and selenium precursor solution.

2 Grams of the zinc precursor solution and 1 g of the selenium precursor solution were mixed, and approximately 10 mg of the InP fine particles obtained (after the removal of the solvent) in Example 1 were added thereto. The mixture was heated at 240° C. for 3 hours and then allowed to naturally cool to room temperature, whereby there were synthesized ZnSe-coated InP fine particles dispersed in the TOP solvent. In this case, no precipitate was observed in the dispersion.

An excess ethanol (supplied by Wako Pure Chemical Industries, Ltd.) was added to the above-obtained dispersion to precipitate the ZnSe-coated InP fine particles. The thus-generated precipitate was recovered by centrifugal separation and dispersed in toluene. The ZnSe-coated InP fine particles exhibited high dispersibility in toluene.

In the above case, the above ZnSe-coating step is repeated with regard to the obtained ZnSe-coated InP fine particles (that may be recovered by the centrifugal separation or obtained by removing toluene from the dispersion), whereby the thickness of the ZnSe coating film can be increased. By increasing the thickness of the ZnSe film on the InP particle, the fluorescence intensity of InP can be improved.

Figure 3:
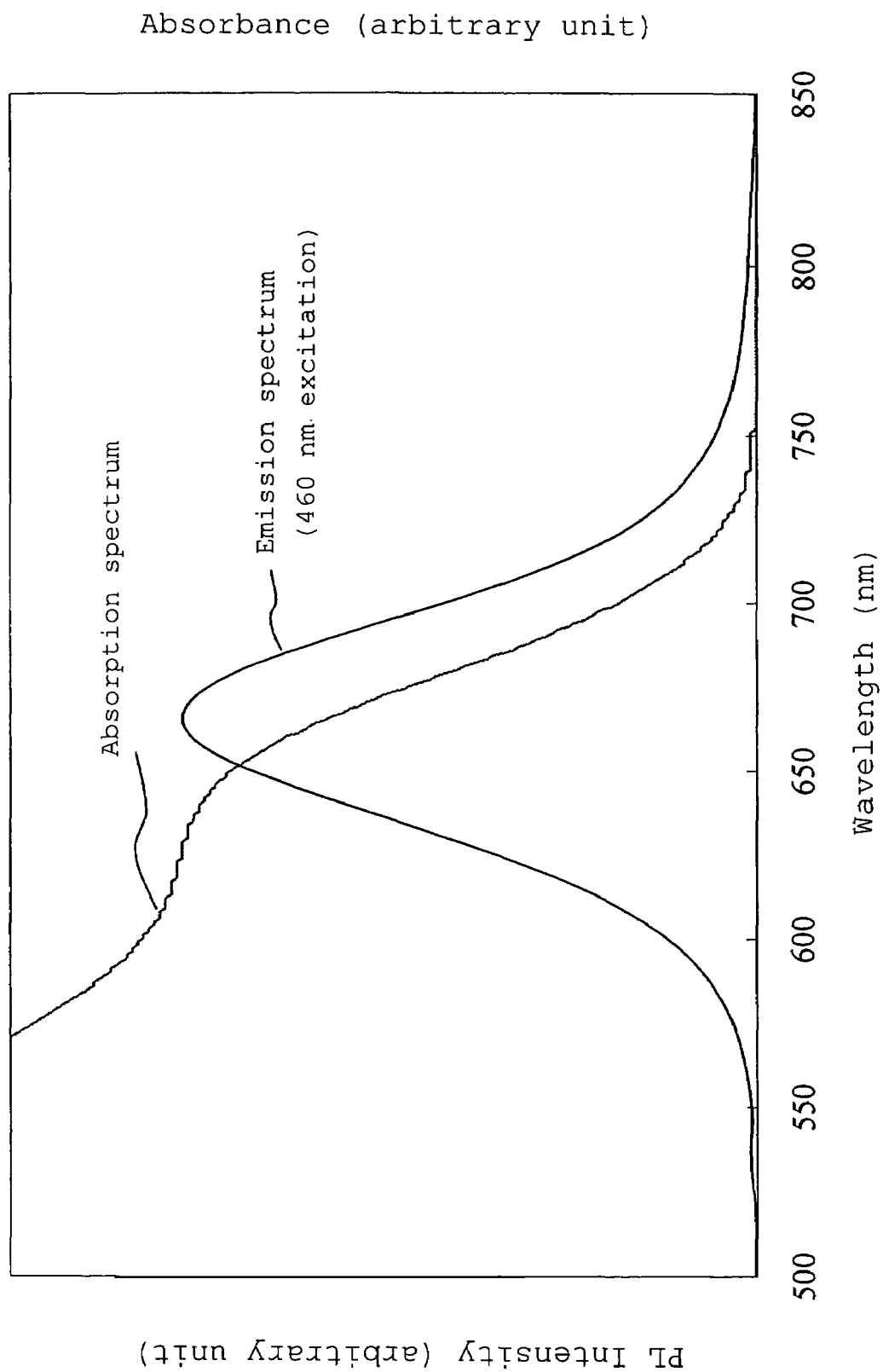
FIG. 3 shows absorption spectrum and emission spectrum of ZnSe-coated InP fine particles obtained in Example 3.

FIG. 3 shows absorption spectrum and emission spectrum (excited at 460 nm) of the obtained ZnSe-coated InP fine particles. The obtained ZnSe-coated InP fine particles were improved in emission intensity as compared with non-coated InP fine particles. It is considered that the above improvement was attained since the defect states near the surface of the InP fine particles and the surface states were quenched by forming the ZnSe coat on the InP surface and since there was obtained the exciton confinement effect in the InP fine particles by the coating with ZnSe having a larger band gap than the InP fine particles.

Examples 4-6

Dispersion of InP fine particles were obtained in the same manner as in Example 1 except that the $InCl_3$:$In(OiPr)_3$ molar ratio was changed to 3:1 (Example 4), 1:1 (Example 5) or 1:3 (Example 6) and that the heating time period was changed to 180 minutes. No precipitate was observed in any one of the obtained dispersions.

Figure 4:
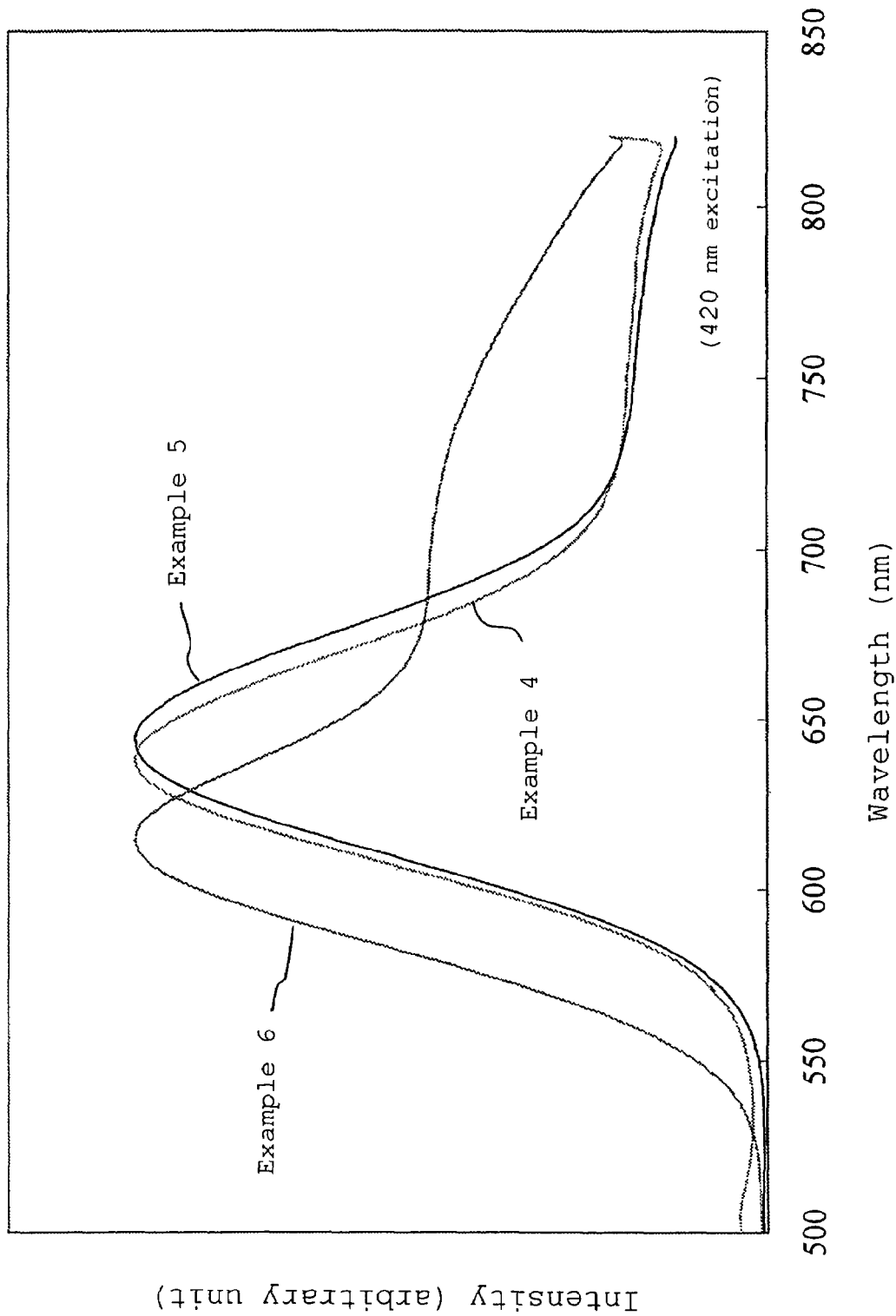
FIG. 4 shows emission spectra of InP fine particles obtained in Examples 4 to 6.

Further, each dispersion of InP fine particles was treated in the same manner as in Example 1, and the InP fine particles in each Example were measured for emission spectrum at an excitation at 420 nm. FIG. 4 shows the emission spectra thereof, and FIG. 5 shows absorption spectra thereof.

It can be seen from the above results that the particle size of InP fine particles to be generated can be controlled by adjusting the amount ratio of $InCl_3$ and $In(OiPr)_3$. Further, when the amount ratio of $In(OiPr)_3$ is increased, the emission spectrum tends to shift toward the short wavelength side, so that it is seen that the particle size of InP fine particles tends to decrease.

Figure 5:
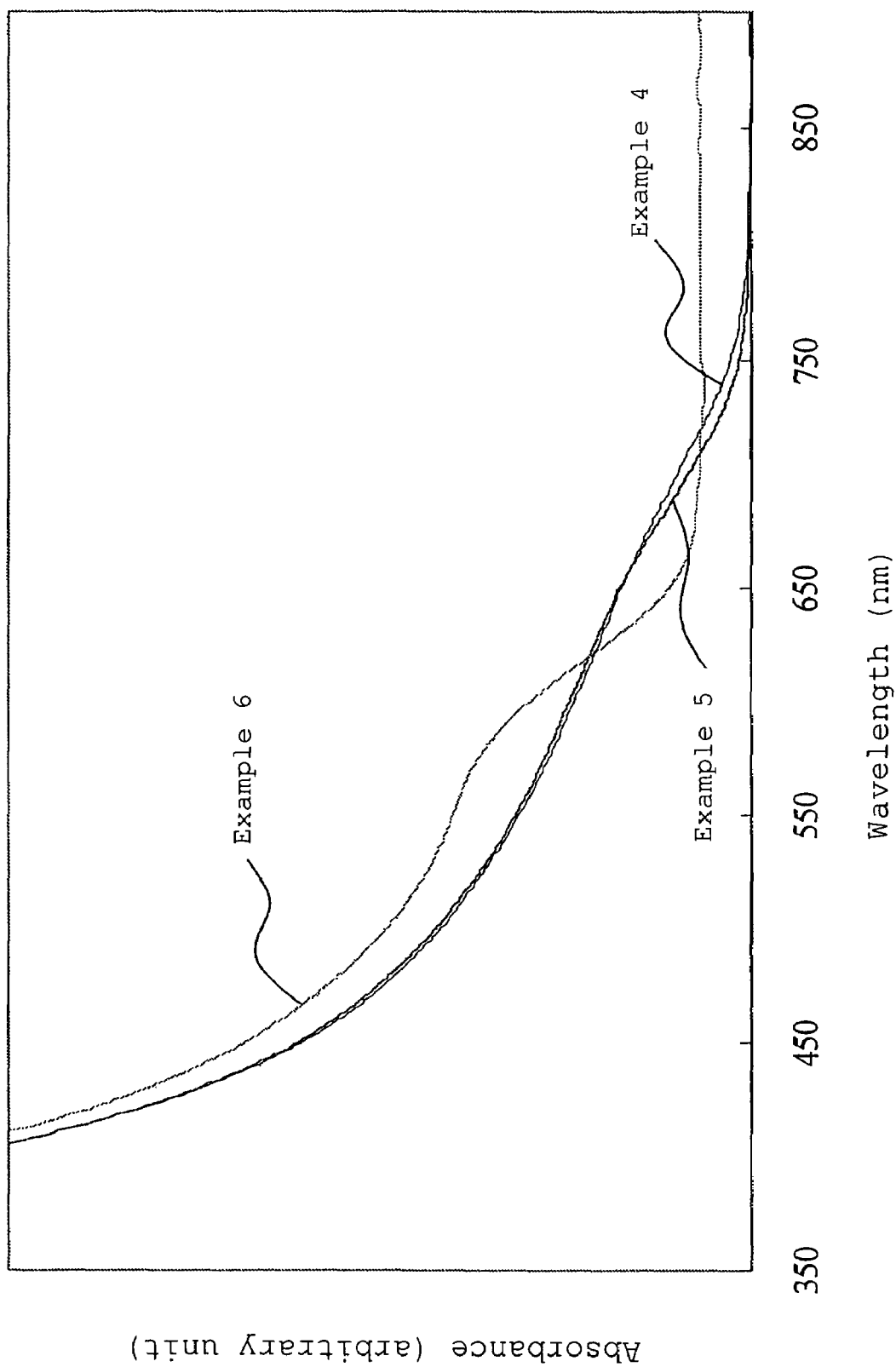
FIG. 5 shows absorption spectra of InP fine particles obtained in Examples 4 to 6.

In FIG. 5, further, with an increase in the amount ratio of $In(OiPr)_3$, it is easier to recognize the existence of peaks in absorption spectrum. It is hence seen that the particle size distribution of InP fine particles to be obtained can be decreased by increasing the amount ratio of $In(OiPr)_3$.

Examples 7-9

Dispersions of InP fine particles were obtained in the same manner as in Example 1 except that the $InCl_3$:$In(OiPr)_3$ molar ratio was changed to 5:1 and that the heating time period was changed to be 180 minutes (Example 7), 30 minutes (Example 8) or 10 minutes (Example 9) long. No precipitate was observed in any one of the obtained dispersions.

Figure 6:
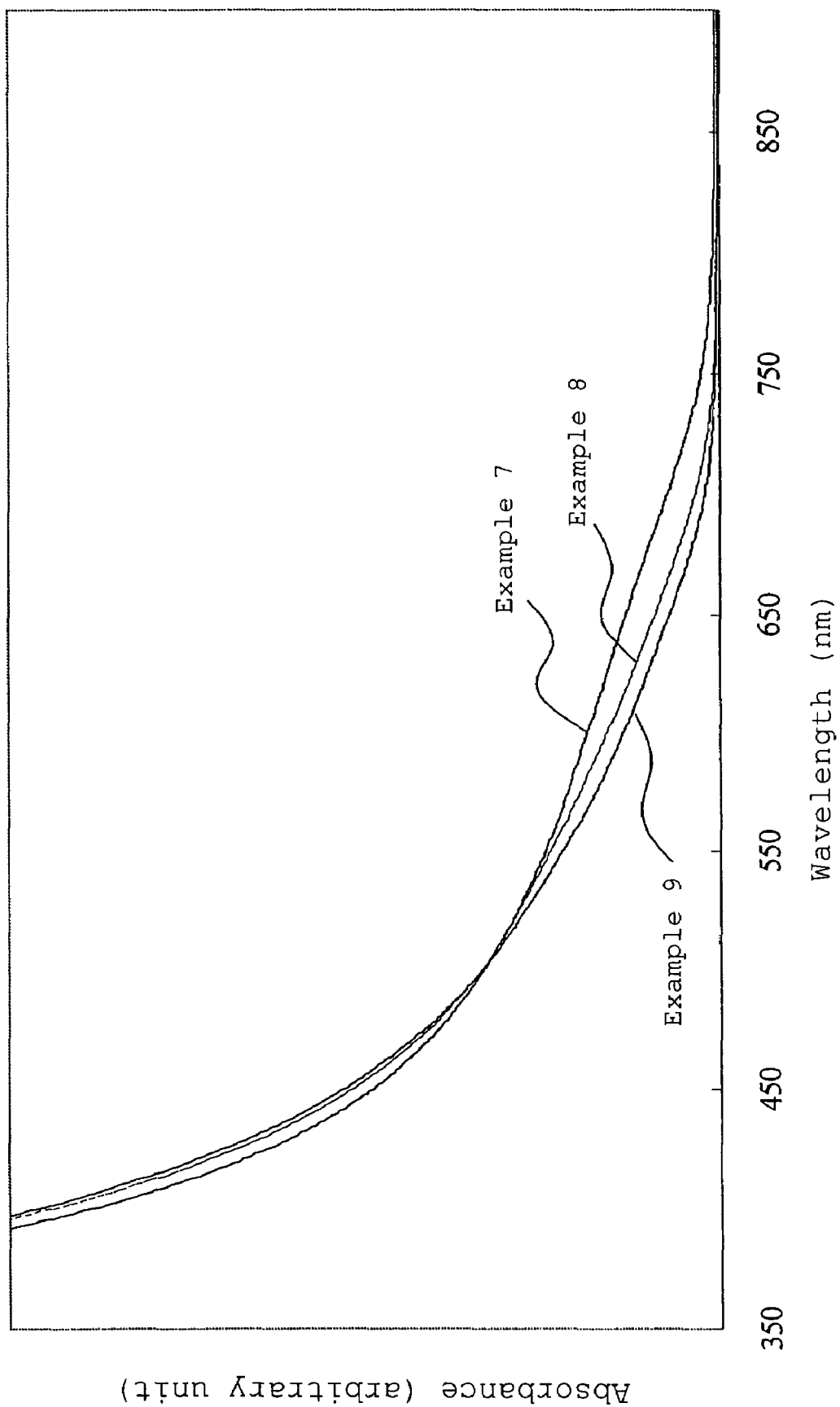
FIG. 6 shows emission spectra of InP fine particles obtained in Examples 7 to 9.

Each dispersion of InP fine particles was treated in the same manner as in Example 1, and the InP fine particles in each Example were measured for absorption spectrum. FIG. 6 shows absorption spectra thereof.

In FIG. 6, the absorption peaks are broad even if the reaction time period was any one of the above, and it has been found that InP fine particles having a large particle size distribution can be obtained. Further, it is observed that the absorption peak position tends to shift toward the short wavelength side with the passage of reaction time period, so that it is seen that InP fine particles having a large particle size are obtained with an increase in the reaction time period.

Examples 10-12

Dispersions of InP fine particles were obtained in the same manner as in Example 1 except that the $InCl_3:In(OiPr)_3$ molar ratio was changed to 1:5 and that the heating time period was changed to be 180 minutes (Example 10), 30 minutes (Example 11) or 10 minutes (Example 12) long. No precipitate was observed in any one of the obtained dispersions.

Figure 7:
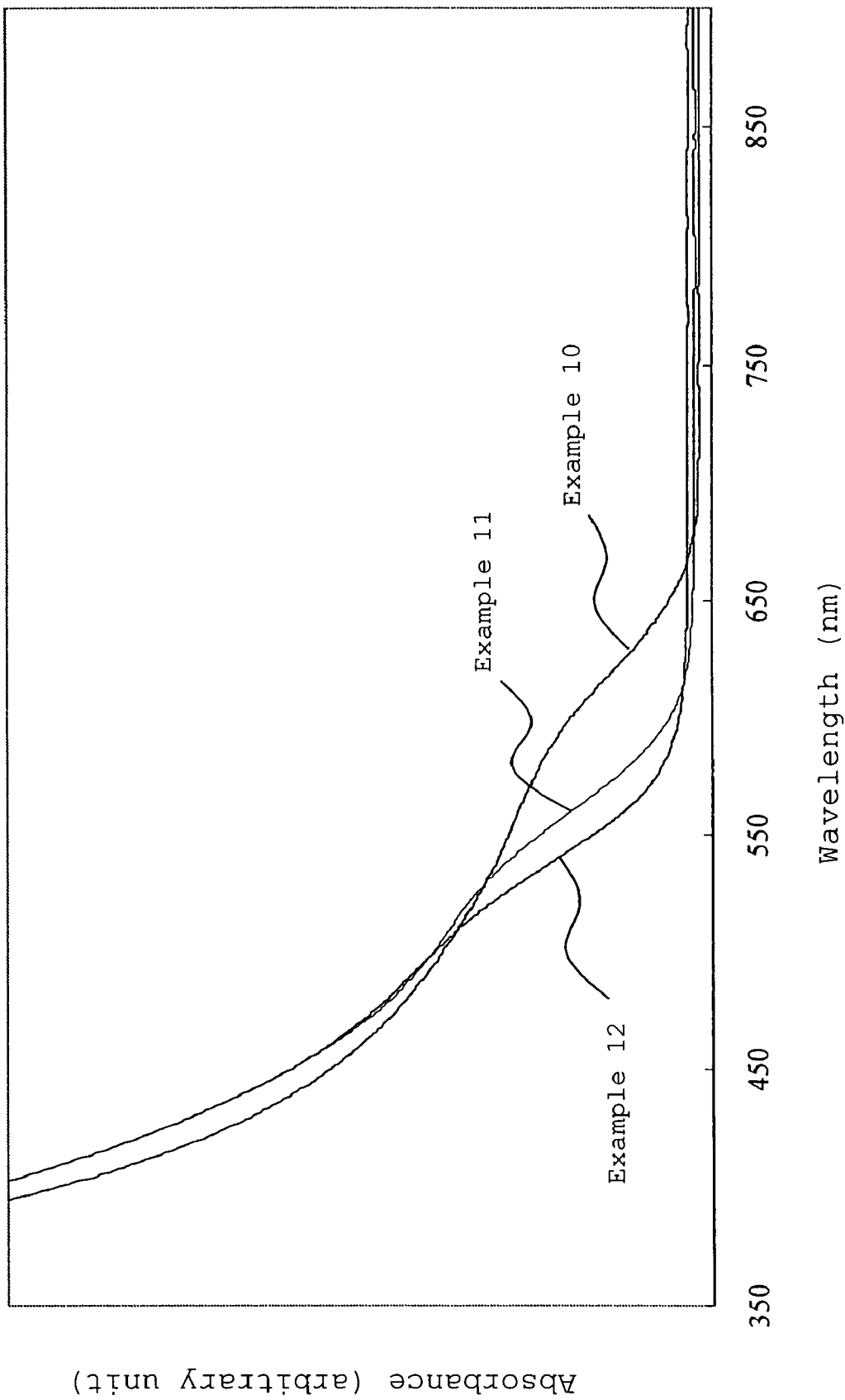
FIG. 7 shows absorption spectra of InP fine particles obtained in Examples 10 to 12.

Each dispersion of InP fine particles was treated in the same manner as in Example 1, and the InP fine particles in each Example were measured for absorption spectrum. FIG. 7 shows absorption spectra thereof.

In FIG. 7, the absorption peaks are clear as compared with the peaks in FIG. 6 even if the reaction time period was any one of the above, and it has been found that InP fine particles having a relatively small particle size distribution can be obtained. Further, the absorption peak position shifts toward the short wavelength side with the passage of reaction time period, so that it is seen that InP fine particles having a larger particle size are obtained with an increase in the reaction time period.

Example 13

A dispersion of InP fine particles was obtained in the same manner as in Example 1 except that TOP was replaced with 4-phenylpropyl pyridine. No precipitate was observed in the obtained dispersion.

Figure 8:
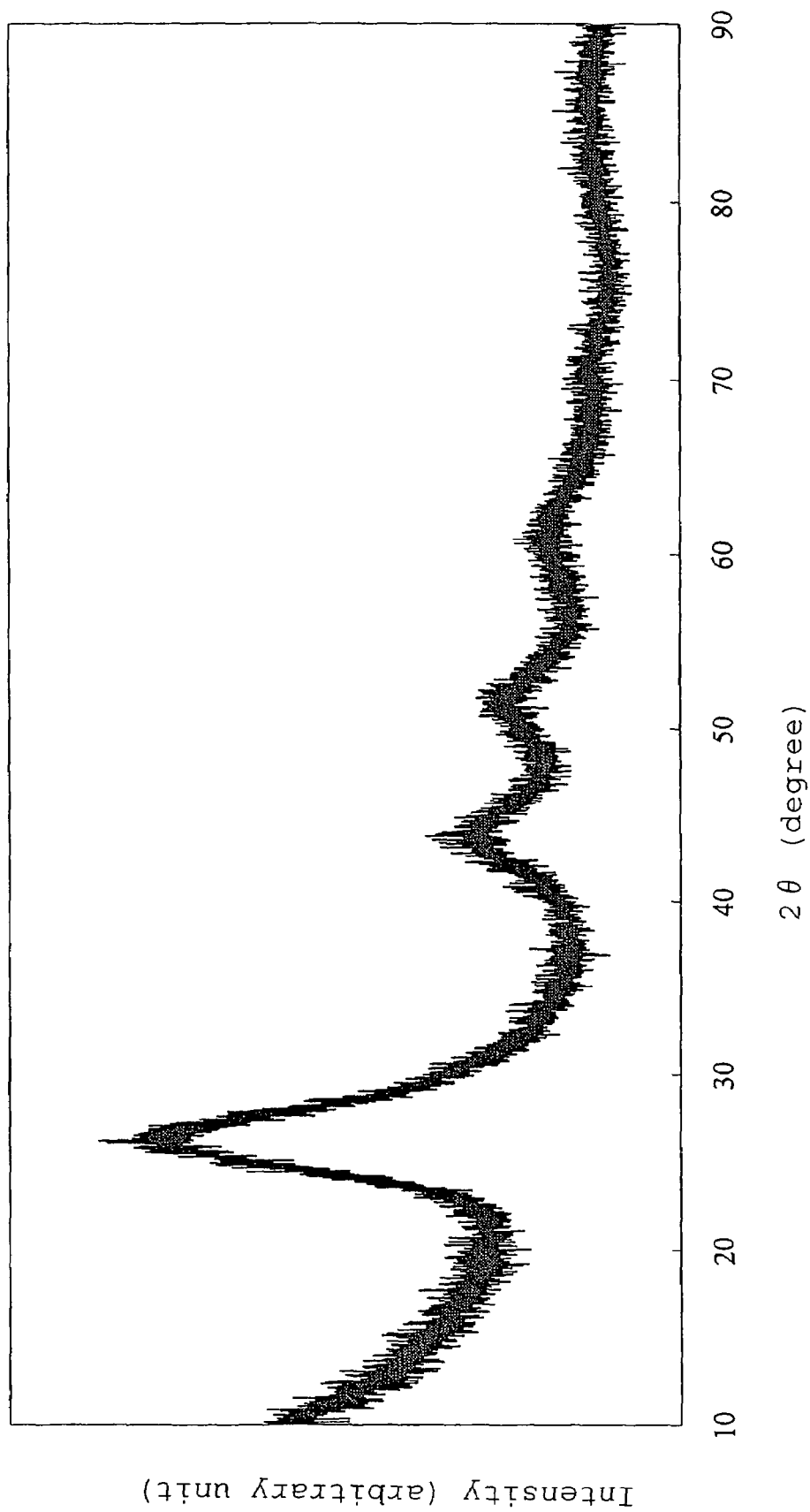
FIG. 8 is an XRD pattern of InP fine particles obtained in Example 3.

The above dispersion of InP fine particles was treated in the same manner as in Example 1, and the InP fine particles were subjected to the XRD analysis. FIG. 8 shows an XRD pattern. In this Figure, it can be seen that scattering peak positions are in agreement with peak positions of bulk InP, and it has been found that an InP crystal of a zincblende type was also obtained.

Comparative Example 1

Figure 9:
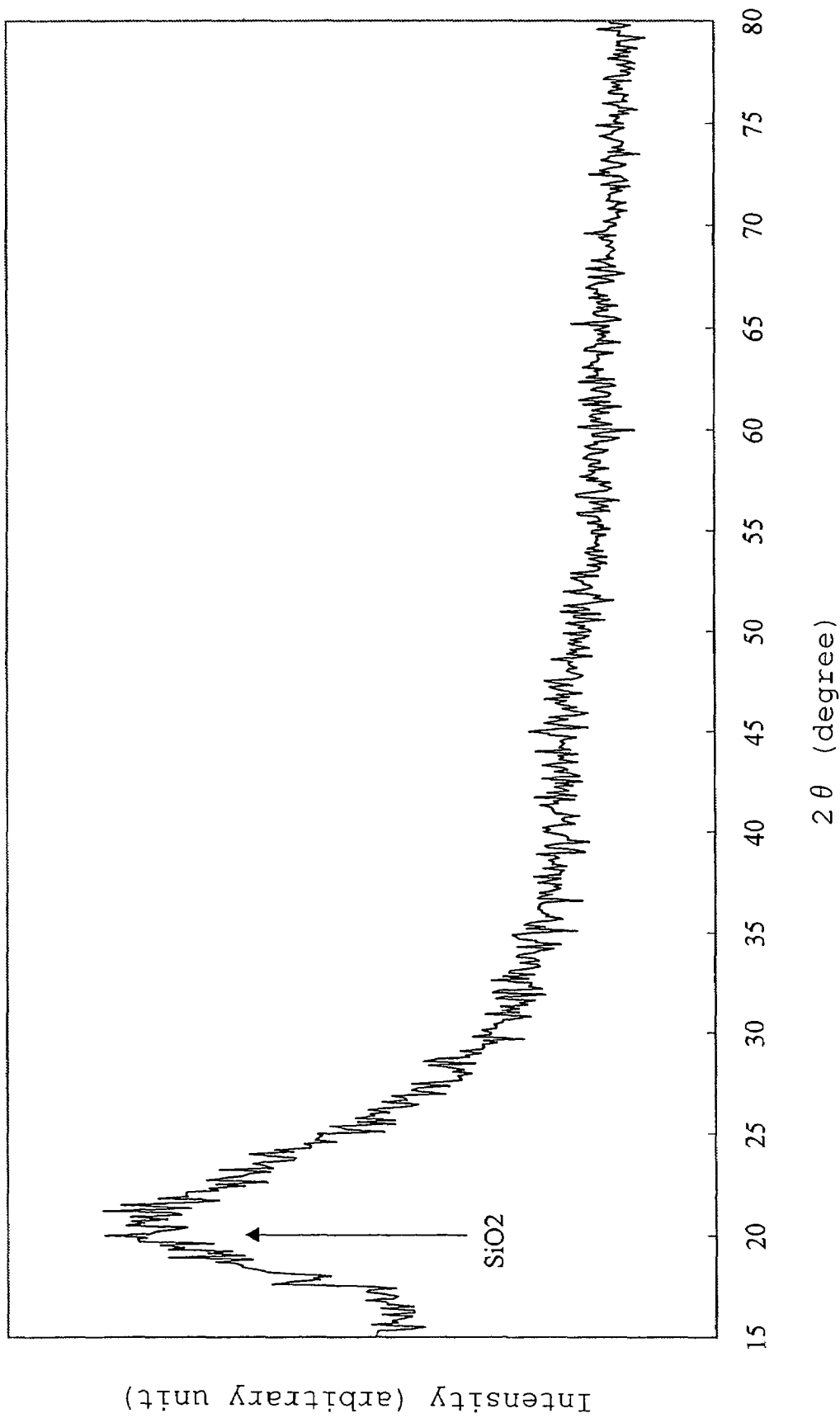
FIG. 9 is an XRD pattern of amorphous InP obtained in Comparative Example 1.

InP was generated in the same manner as in Example 1 except that 120 μmol of $InCl_3$ alone was used as an In raw material and that the heating time period was changed to 180 minutes long. The InP generated did not crystallize and was in an amorphous state. The InP was subjected to the XRD analysis using a glass substrate, and FIG. 9 shows an XRD pattern thereof. In FIG. 9, a band around 22° is an $SiO_2$ band derived from the glass substrate.

Comparative Example 2

InP was generated in the same manner as in Example 1 except that 120 μmol of $In(OiPr)_3$ alone was used as an In raw material and that the heating time period was changed to 180 minutes long. It was found that the reaction mixture had InP crystal particles precipitated therein.

INDUSTRIAL UTILITY

According to the process of the present invention, there can be efficiently produced InP fine particles having a nano-meter size for a short period of time by a wet method. The InP fine particles obtained are remarkably excellent in dispersibility and are useful as a luminescence center for a light-emitting diode or the like.

The invention claimed is:

1. A process for the production of InP fine particles, which comprises reacting an In raw material consisting of two or more In compounds with a P raw material consisting of at least one P raw compound in a solvent,
   the process using, as said two or more In compounds, at least one first In compound having a group that reacts with a functional group of P compound having a P atom adjacent to an In atom to be eliminated with the functional group in the formation of an In-P bond and at least one second In compound having a lower electron density of In atom in the compound than said first In compound, and the process using a Lewis base solvent as said solvent.

2. The process of claim 1, wherein the first In compound is an In compound selected from indium hydroxide, indium alkoxide, indium sulfide, indiumamide, indium organic acid salt or indium inorganic acid salt.

3. The process of claim 1, wherein the second In compound is $InR_n$ in which R is a hydrogen atom, a halogen atom or a hydrocarbon group and n is a number that satisfies the relationship of $1 \leq n \leq 3$ provided that when a plurality of Rs are present, any one of the plurality of Rs may be the same as, or different from, the other or every other one.

4. The process of claim 1, wherein the In compounds and the P compound are used in such a manner that the In atmos are in a stoichiometrically excess amount over the P atoms.

5. The process of claim 4, wherein the molar ratio of the In atoms and the P atoms is 1:0.1 to 1:0.9.

6. The process of claim 1, wherein the first In compound and the second In compound are used in an In atom molar ratio of 0.2:1 to 8:1.

7. The process of claim 6, wherein the ratio of the first In compound and the second In compound used is adjusted to control the particle size of the InP fine particles to be generated.

8. The process of claim 1, wherein the Lewis base solvent is at least one solvent selected from solvents that do not react with the In material and the P material and dissolves the In material and the P material.

9. The process of claim 1, wherein the In fine particles generated have the solvent coordinated around them.

10. The process of claim 1, wherein the temperature of the reaction is 150 to 350° C.

* * * * *